United States Patent [19]
Pomrink et al.

[11] Patent Number: 5,968,246
[45] Date of Patent: Oct. 19, 1999

[54] STABILIZED COMPOSITION FOR TREATMENT OF METAL SURFACES

[75] Inventors: Gregory J. Pomrink, Horsham; Brenda S. Morris, Warminster, both of Pa.

[73] Assignee: Betzdearborn, Trevose, Pa.

[21] Appl. No.: 09/036,331

[22] Filed: Mar. 6, 1998

[51] Int. Cl.$^6$ ................................................. C08G 77/02
[52] U.S. Cl. ........................... 106/287.16; 106/287.24; 106/14.14; 525/100; 427/387
[58] Field of Search .................. 106/287.16, 287.24, 106/14.14; 525/100; 427/387

[56] References Cited

U.S. PATENT DOCUMENTS 5,514,211  5/1996  Marks et al. ...................... 106/287.16
5,879,437  3/1999  Hartman ............................. 106/14.44

*Primary Examiner*—Melvyn I. Marquis
*Assistant Examiner*—Mark W. Milstead
*Attorney, Agent, or Firm*—Betzdearborn Inc.; Steven D. Boyd

[57] ABSTRACT

An aqueous stabilized composition for the treatment of surfaces such as metals, particularly aluminum, comprises a tetraalkyl silicate or a monomeric or oligomeric hydrolysis product thereof, an inorganic passenger powder below 100 nanometer diameter such as fumed or colloidal silica and a stabilizer, all dispersed in a fluid aqueous medium. The stabilizer comprises a carboxylic acid polymer, copolymer or salt thereof, preferably an acrylic acid polymer, copolymer or salt thereof, and most preferably a polyacrylic acid.

17 Claims, No Drawings

STABILIZED COMPOSITION FOR TREATMENT OF METAL SURFACES

FIELD OF THE INVENTION

The present invention relates to stabilized aqueous compositions for surface treatment. More particularly, the present invention relates to stabilized aqueous compositions which when applied to a metal surface increase the adhesion of subsequently applied coatings such as paints, lacquers, varnishes or adhesives. The composition of the present invention is generally effective on metal surfaces and is particularly effective on aluminum surfaces.

BACKGROUND OF THE INVENTION

The treatment of metal surfaces with solutions to provide corrosion resistance and to enhance the adhesion properties of the surface are well known in the art. As used herein metal surfaces refers to metal in general such as steel, galvanized steel, titanium, copper, zinc and in particular aluminum. The term aluminum as used herein refers to the pure metal as well as alloys thereof. Compositions are applied to metal surfaces to, in part, improve the adhesive properties of a subsequently applied coating such as paint, varnish, lacquer or adhesives. Such coating may improve either the initial adhesion of the subsequently applied coating to the surface or the maintenance of such adhesive properties over time, or both the initial adhesion and maintenance of adhesion properties.

U.S. Pat. No. 5,514,211 discloses an aqueous composition for the treatment of metal surfaces which comprises a tetraalkyl silicate or a monomeric or oligomeric hydrolysis product thereof, and an inorganic passenger powder below 100 nanometers in diameter, such as fumed silica, both dispersed in a fluid aqueous medium. The coating composition disclosed in U.S. Pat. No. 5,514,211 provides enhanced adhesion properties when applied to a metal surface. However, the hydrolyzed tetraalkyl silicate/colloidal silica aqueous dispersions disclosed therein exhibit a lack of stability. That is, such aqueous dispersions are subject to gelling and sludging shortly after preparation. The formation of a hard packed sludge, which is difficult to redisperse, is not uncommon. Such gelling and sludge formation and the resulting required remixing prior to application adversely affected the marketability of the surface treatment composition disclosed therein.

The present inventors have discovered that the addition of a stabilizer to the aqueous dispersion metal treatments disclosed in U.S. Pat. No. 5,514,211 significantly enhances the stability of the dispersion without adversely impacting the metal surface treatment properties of the dispersion. The dispersion stabilizer of the present invention is preferably a high molecular weight carboxylic acid polymer, copolymer or salt thereof, more preferably the dispersion stabilizer of the present invention is a high molecular weight acrylic acid polymer, copolymer or salt thereof, and most preferably a high molecular weight polyacrylic acid.

DESCRIPTION OF THE PREFERRED EMBODIMENT

The present invention provides a stabilized coating composition comprising a tetraalkyl silicate or a monomeric or oligomeric hydrolysis product thereof, and an inorganic oxide passenger powder below 100 nanometers in diameter and a stabilizer, all in dispersion in a fluid aqueous medium. The stabilizer is preferably a polymeric high molecular weight carboxylic acid or salt thereof.

Tetraalkyl silicates (or tetraalkoxy silane) can be progressively hydrolyzed to silica. The unhydrolyzed tetraalkyl ester can be used for the present invention, but it is not preferred and in fact is preferably absent to reduce volatiles. Preferably, the ester is partially hydrolyzed to give oligomers. Improved properties may be obtained when at least 90% by weight of the oligomeric hydrolysis product has a molecular weight below about 1700. The commercially available silicate Dynasil 40 (available from Huls America Inc.) is suitable. This component should generally be present in a proportion of about 40 to 80%, preferably 50 to 70% by weight of the non-volatile content of the unstabilized composition.

The composition also contains an inorganic oxide passenger powder, for example, silica, zirconia, titania, or alumina. This may be prepared, for example, by comminution or by vapor phase techniques such as flame hydrolysis. The powder has an average particle size below 100 nanometers and preferably below 50 nanometers. Powders with this order of particle size not only improve adhesion but also do so without adversely changing the topography of the treated substrate.

Fumed silica or colloidal silica of particle size below 25 nanometers down to about 7 nanometers is preferred, but fumed titania can also be used. The powder assists in the formation of an insoluble matrix after drying, and is preferably present in the aqueous prestabilized composition in a proportion of about 20 to 60% and particularly 30 to 50% by weight of the nonvolatile content of the composition.

The composition preferably also contains a cosolvent, which helps to wet the surfaces to be coated and also to stabilize the aqueous dispersion. Suitable cosolvents are polar organic liquids, which are at least partly water soluble and preferably volatile, for example mono and polyhydric alcohols and ethers. When used, the cosolvent is preferably present in a proportion of from about 0.1 to 30% particularly 1 to 10% by volume of the prestabilized aqueous composition.

Conventional corrosion inhibiting constituents may be included in the coating composition of the present invention.

The composition may also include a catalyst which assists in the chain extension and crosslinking of the binder in the presence of moisture. The catalyst is used in a concentration to achieve hydrolysis of the tetraalkyl silicate in a convenient time. Suitable catalysts are mineral and organic acids such as nitric and acetic acid or bases such as amines. Other suitable catalysts are latent catalysts such as salts or complexes of acids and bases which cease to be neutral on their decomposition. An example of a latent catalyst, which becomes acidic on decomposition, is ammonium acetate. Other suitable catalysts are those which are latent and generate bases on decomposition. An example of blocked catalysts of this kind is amine titanate chelate. Acid peptized sols, such as zirconium oxide sol peptized in nitric acid may also be used.

Catalysts are in general not required in the composition of the present invention, and are preferably omitted. Though also not preferred, it is possible according to the present invention to apply a coating composition not containing a catalyst to a surface, and then to apply the catalyst in a subsequent operation to hasten hydrolysis and chain extension of the polysiloxane.

The composition of the present invention may also include hydrogen peroxide at a concentration of 20 grams per liter. This may be particularly useful when an acid catalyst is used.

Water has a harmful effect on adhesive bonds. Thus, components which are hygroscopic or humectant and which act to attract or retain moisture in the coating are preferably not included in the coating composition.

The coating composition preferably has a pH from 5.5 to 10.5 and particularly from 6.0 to 10.1. If the pH is too high, the unstabilized emulsion is less stable, and the composition has a poor shelf life. If the pH is too low, it may chemically attack the surface to which it is applied.

The stabilized coating composition of the present invention may be prepared with a homogenizer to provide high sheer mixing or, preferably with standard mixing equipment. When prepared with a homogenizer, a convenient method is to add hydrolyzed tetraalkyl silicate to a cosolvent such as propylene glycol followed by the addition of an inorganic oxide passenger powder and a modified polysiloxane in deionized water. Thereafter, the stabilizer is added. The preferred method of preparation which requires standard mixing equipment comprises addition of the stabilizer to deionized water followed by addition of hydrolyzed tetraalkyl silicate, modified polysiloxane, a cosolvent such as propylene glycol and an inorganic oxide passenger powder.

The stability and shelf life of the hydrolyzed tetraalkyl silicate/colloidal silica aqueous dispersion composition is significantly improved by incorporation of a stabilizer into the composition. The stabilizer is preferably a high molecular weight polymeric carboxylic acid or salt, more preferably a high molecular weight acrylic acid polymer, copolymer or salt thereof, and most preferably a high molecular weight polyacrylic acid. The polymeric carboxylic acid or salt preferably has a molecular weight of from about 600,000 to about 1,000,000. The most preferred polyacrylic acid may be a powder or a liquid homopolymer or copolymer. The stabilizer is preferably added to the composition in amounts ranging from about 0.175 to 1.75% by weight as dry polyacrylate in a 6.0 to 10.1 pH range composition.

The composition of the present invention may be applied to a surface by a convenient application technique such as roll coating, brushing or spraying. For aluminum strip, roll coating is preferred. The formulation may need to be adjusted to provide a convenient viscosity for application by the desired method. After application and drying, the coating on the surface is cured. Curing temperatures are from ambient up to 400° C., usually though not always below those required to fully sinter the inorganic particles and may typically be in the range of from about 50 to 200° C. With aluminum substrates, preferred curing temperatures are in the range of from about 100 to 150° C. Calcination of the coating at temperatures above 400° C. is possible, but not usually necessary.

The surface preferably carries the coating at a thickness of about 0.01 to 0.7 micrometers, particularly from about 0.05 to 0.5 micrometers. It is difficult to apply thicker film satisfactorily in a no-rinse type treatment. The present invention may also include as an additional methods step the application to the coated surface of an organic coating such as paint, lacquer, varnish or adhesive.

The present invention will now be illustrated with reference to a number of specific examples, which are to be regarded solely as illustrative and not as restricting the scope of the present invention.

EXAMPLES

Stabilized and unstabilized samples of a coating composition were prepared for evaluation with and without the use of a homoginizer to determine the effects of particle size on emulsion stability. Homogenized samples were prepared by the addition of a hydrolyzed silicic acid tetraethyl ester to propylene glycol followed by the addition of modified dimethyl polysiloxane, amorphous silicate dispersion and deionized water. Homogenizing was continued during and after the addition of each material. Stabilized samples were treated with a high molecular weight from about 600,000 to about 1,000,000 polyacrylic acid emulsion after homogenization to prevent polymer hydrolysis.

Samples prepared without homogenization were mixed using standard mixing equipment and were prepared by adding a high molecular weight polyacrylic acid emulsion to deionized water followed by the addition of hydrolyzed silicic acid tetraethyl ester, modified dimethyl polysiloxane, propylene glycol and amorphous silicate dispersion. Unhomogenized samples without stabilizers were prepared by omitting the addition of high molecular weight polyacrylic acid emulsion.

The samples were evaluated through exposure to constant temperature climates ranging from 4 to 50° C. for periods of from 1 to 3 weeks. The samples were then tested for static stability by determining the height of the separation layer (in millimeters) as a percentage of the entire sample height. The resistance of the separated layer to movement upon inversion and mixing was also evaluated. Failure to redisperse indicated hard packed sludging.

The following table summarizes the samples which were evaluated and the results of stabilizer testing. In the table, the following designations are used for the raw materials: 1=deionized water, 2=polyacrylate, 3=hydrolyzed silicic acid tetraethyl ester, 4=modified dimethyl polysiloxane, 5=propylene glycol, and 6=amorphous silica dispersion. Static stability was determined by measuring the height of the separation layer (in mm) as a percentage of the entire sample height (mm).

| Raw Materials | Amount (% by weight) | | | | | | | | | |
|---|---|---|---|---|---|---|---|---|---|---|
| 1. | 54.4 | 54.4 | 53.9 | 53.9 | 53.4 | 53.4 | 52.9 | 52.9 | 52.4 | 52.4 |
| 2. | 0.0 | 0.0 | 0.5 | 0.5 | 1.0 | 1.0 | 1.5 | 1.5 | 2.0 | 2.0 |
| 3. | 13.4 | 13.4 | 13.4 | 13.4 | 13.4 | 13.4 | 13.4 | 13.4 | 13.4 | 13.4 |
| 4. | 0.7 | 0.7 | 0.7 | 0.7 | 0.7 | 0.7 | 0.7 | 0.7 | 0.7 | 0.7 |
| 5. | 13.3 | 13.3 | 13.3 | 13.3 | 13.3 | 13.3 | 13.3 | 13.3 | 13.3 | 13.3 |
| 6. | 18.2 | 18.2 | 18.2 | 18.2 | 18.2 | 18.2 | 18.2 | 18.2 | 18.2 | 18.2 |
| Homogenizer (Y/N) | Yes | No | Yes | No | Yes | No | Yes | No | Yes | No |
| Stability (1 week % separated) | | | | | | | | | | |
| 4 C | 85* | 85* | 20 | 30 | 0 | 10 | 0 | 0 | 0 | 0 |

-continued

| | | | | | | | | | | |
|---|---|---|---|---|---|---|---|---|---|---|
| 25 C | 85* | 85* | 30 | 50 | 0 | 30 | 0 | 0 | 0 | 0 |
| 50 C | 85* | 85* | 60 | 85 | 0 | 50 | 0 | 0 | 0 | 0 |
| Stability (3 week) | | | | | | | | | | |
| 4 C | 85* | 85* | 85 | 85 | 0 | 50 | 0 | 0 | 0 | 0 |
| 25 C | 85* | 85* | 85 | 85 | 10 | 60 | 0 | 0 | 0 | 0 |
| 50 C | 85* | 85* | 85 | 85 | 10 | 85 | 0 | 0 | 0 | 0 |
| Hard-pack sludging | Yes | Yes | No | No | No | No | No | No | No | No |

*Complete separation occurred within 2 hrs. of manufacture

The results summarized in the table showed that formulations which include the stabilizer exhibit significantly less settling/separation and do not exhibited hard packed sludging as did the unstabilized controls.

The stabilizer of the present invention provides a metal surface treatment composition which is resistant to separation on standing, does not form persistent gels and does not form a hard-packed sludge upon standing. As shown by the above examples, the stabilizer of the present invention eliminated the formation of a gel or hard-packed sludge, even upon standing for three weeks. The composition which included the stabilizer was resistant to separation, even upon standing for three weeks at a wide range of temperatures. Furthermore, stabilized compositions in accordance with the present invention which exhibited separation upon standing were easily redispersed by simple mixing or inversion. Compositions which did not include the stabilizer separate shortly after preparation and were difficult to redisperse after separation.

While the present invention has been described with respect to particular embodiments thereof, it is apparent that numerous other forms and modifications of this invention will be obvious to those skilled in the art. The appended claims and this invention generally should be construed to cover all such obvious forms and modifications, which are within the true spirit and scope of the present invention.

What is claimed:

1. A coating composition suitable for application to a surface to improve the adhesion properties of the surface, said coating composition consisting essentially of a binder, which is a tetraalkyl silicate or a monomeric or oligomeric hydrolysis product thereof, an inorganic oxide below 100 nanometers, primary particle diameter, and optionally at least one component selected from the group consisting of corrosion inhibitors, surfactants, adhesion promoters, markers, catalysts for chain extension and cross-linking of the binder, and hydrogen peroxide, all in dispersion in a fluid aqueous medium consisting of water containing up to 30% by volume of a polar organic liquid at least partially miscible with water, the improvement comprising a coating composition stabilizing amount of carboxylic acid polymer, copolymer or salt thereof.

2. The composition of claim 1, wherein the inorganic oxide is below 25 nanometers primary particle diameter and is present in a proportion of about 30 to 60% by weight of the nonvolatile content of the composition.

3. A composition as claimed in claim 1, wherein the inorganic oxide is colloidal silica.

4. A composition as claimed in claim 1, wherein the oligomeric hydrolysis product is a polydialkyl siloxane and is present in a proportion of from about 40 to 70% by weight of the nonvolatile content of the composition.

5. A composition as claimed in claim 1, wherein said tetraalkyl silicate or monomeric or oligomeric hydrolysis product thereof is an oligomeric partial hydrolysis product of tetraethyl silicate.

6. A composition as claimed in claim 1, wherein from about 0.1 to 30% by volume of a polar organic liquid at least partially miscible with water is also present.

7. A method of pretreating an aluminum work piece which method comprises applying to a surface of the work piece a coating composition according to claim 1 and drying said coating in place.

8. A composition as claimed in claim 1, wherein said carboxylic acid polymer, copolymer or salt thereof is an acrylic acid polymer, copolymer or salt thereof.

9. A composition as claimed in claim 1, wherein said carboxylic acid polymer, copolymer or salt thereof is polyacrylic acid.

10. A composition as claimed in claim 1, wherein said carboxylic acid polymer, copolymer or salt thereof has a molecular weight ranging from about 600,000 to 1,000,000.

11. A composition as claimed in claim 1, wherein said carboxylic acid polymer, copolymer or salt thereof is present in said coating composition in a proportion of from about 0.175 to 1.75% by weight of said coating composition.

12. A nonaqueous product consisting essentially of a binder which is a tetraalkyl silicate or a monomeric or oligomeric hydrolysis product thereof, an inorganic oxide below 100 nanometers primary particle diameter, and optionally at least one component selected from the group consisting of corrosion inhibitors, surfactants, adhesion promoters, markers, catalysts for chain extension and crosslinking of the binder, and hydrogen peroxide, said product being dispersable in a fluid aqueous medium consisting of water containing up to 30% by volume of a polar organic liquid at least partially miscible with water, to give a coating composition suitable for application to a surface to improve the adhesion properties of the surface wherein the improvement comprises a coating composition stabilizer comprising a carboxylic acid polymer, copolymer or salt thereof.

13. A product as claimed in claim 12 comprising about 20 to 50% by weight of the tetraalkyl silicate or hydrolysis product, about 10 to 45% by weight of the organic oxide and 20 to 60% by weight of volatile polar organic liquid at least partially miscible in water.

14. A nonaqueous product of claim 12, wherein said carboxylic acid polymer, copolymer or salt stabilizer is an acrylic acid polymer, copolymer or salt.

15. A nonaqueous product of claim 12, wherein said carboxylic acid polymer, copolymer or salt thereof is a polyacrylic acid.

16. A nonaqueous product of claim 12, wherein said carboxylic acid polymer, copolymer or salt thereof has a molecular weight ranging from about 600,000 to about 1,000,000.

17. A nonaqueous product of claim 12 wherein said carboxylic acid polymer, copolymer or salt thereof is present in said product in a proportion of from about 0.175 to 1.75% by weight of said product.

* * * * *